(12) United States Patent
Xu et al.

(10) Patent No.: US 12,496,916 B2
(45) Date of Patent: Dec. 16, 2025

(54) INTERACTION SYSTEM BETWEEN ELECTRIC VEHICLE AND POWER GRID

(71) Applicant: Delta Electronics (Shanghai) Co., Ltd., Shanghai (CN)

(72) Inventors: Feidong Xu, Shanghai (CN); Lei Jia, Shanghai (CN); Mengyu Liang, Shanghai (CN); Juiyuan Hsu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 128 days.

(21) Appl. No.: 18/434,749

(22) Filed: Feb. 6, 2024

(65) Prior Publication Data
US 2024/0283250 A1    Aug. 22, 2024

(30) Foreign Application Priority Data
Feb. 16, 2023 (CN) .......................... 202310128907.5

(51) Int. Cl.
*B60L 53/10* (2019.01)
*B60L 53/14* (2019.01)
(Continued)

(52) U.S. Cl.
CPC .............. *B60L 53/10* (2019.02); *B60L 53/14* (2019.02); *B60L 53/16* (2019.02); *B60L 53/20* (2019.02);
(Continued)

(58) Field of Classification Search
CPC .......... B60L 53/10; B60L 53/14; B60L 53/16; B60L 53/20; B60L 53/305; B60L 53/66;
(Continued)

(56) References Cited

U.S. PATENT DOCUMENTS

2021/0008996 A1    1/2021   Dow
2021/0305833 A1    9/2021   Marcos Pastor et al.

FOREIGN PATENT DOCUMENTS

CN    107499151 A    12/2017
CN    108556650 A     9/2018
(Continued)

OTHER PUBLICATIONS

Puneet et al. 2023. A Review on Architecture and Communication Protocols for Electric Vehicle Charging System. In Proceedings of the 4th International Conference on Information Management & Machine Intelligence (ICIMMI '22). Association for Computing Machinery, New York, NY, USA, Article 83, 1-6. (Year: 2023).*

*Primary Examiner* — Daniel Cavallari
(74) *Attorney, Agent, or Firm* — CKC & Partners Co., LLC

(57) ABSTRACT

The application provides an interaction system between an electric vehicle and a power grid, including the electric vehicle including: a battery, and an on board charger including a bidirectional power conversion circuit connected to the battery and an on board charger controller; an electric vehicle supply equipment including: a charge and discharge connection device including a first contactor connected between the power grid and the bidirectional power conversion circuit; and an interaction communication system including: an electric vehicle communication controller, a supply equipment communication controller, and the on board charger controller controlling the bidirectional power conversion circuit; wherein, the supply equipment communication controller indirectly communicates with the on board charger controller via the electric vehicle communication controller through a first communication channel, and the supply equipment communication controller further
(Continued)

directly communicates with the on board charger through a second communication channel.

20 Claims, 3 Drawing Sheets

(51) Int. Cl.
    *B60L 53/16*     (2019.01)
    *B60L 53/20*     (2019.01)
    *B60L 53/30*     (2019.01)
    *B60L 53/66*     (2019.01)
    *B60L 55/00*     (2019.01)

(52) U.S. Cl.
    CPC ............. *B60L 53/305* (2019.02); *B60L 53/66* (2019.02); *B60L 55/00* (2019.02); *H02J 2310/48* (2020.01); *Y02T 90/12* (2013.01); *Y02T 90/16* (2013.01)

(58) Field of Classification Search
    CPC ...... B60L 55/00; B60L 53/18; H02J 2310/48; H02J 7/00032; H02J 7/00034; Y02T 90/12; Y02T 90/16; Y02T 10/7072; Y02T 10/70

See application file for complete search history.

(56) References Cited

FOREIGN PATENT DOCUMENTS

| | | |
|---|---|---|
| EP | 3965392 A1 | 3/2022 |
| EP | 3974238 A1 | 3/2022 |
| EP | 3974243 A1 | 3/2022 |
| KR | 20170091385 A | 8/2017 |

\* cited by examiner

INTERACTION SYSTEM BETWEEN ELECTRIC VEHICLE AND POWER GRID

CROSS-REFERENCE TO RELATED APPLICATIONS

This non-provisional application claims priority under 35 U.S.C. § 119(a) on Patent Application 202310128907.5 filed in P.R. China on Feb. 16, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE APPLICATION

1. Field of the Application

The application relates to the field of electric vehicles, and particularly to an interaction system between an electric vehicle and a power grid.

2. Related Art

Due to advantages such as energy conservation and environment protection, easy maintenance, and quiet and comfortable, and enjoying dividends from government policies, electric vehicles (EV) are accelerating to occupy the global market. Conventional charging mode of the electric vehicles is to connect them to an electric vehicle supply equipment (EVSE) (e.g., an AC charging pile) through an on board charger (OBC), and absorb electric energy from the power grid to charge on board batteries. In recent years, V2G (vehicle-to-grid) technology attracts more and more attention, and the core concept is to hope that the electric vehicles can feed the idle electric energy back to the power grid. This is beneficial to suppress a peak-to-valley difference of the power grid, and can also bring economic benefits to users.

In order to ensure stability of the power grid, a distributed power supply must conform to laws and regulations of the local power grid to be allowed to be access to the power grid. Therefore, in order to operate the V2G, it is also demanded that the OBC and the EVSE have a series of functions such as power support and abnormal protection as required by laws and regulations of the power grid, and also own a suitable communication interface to facilitate receiving function configuration information of the power grid sent downstream from the power corporation.

The existing bidirectional OBC and EVSE often do not support additional functions as required by laws and regulations of the power grid. Meanwhile, the bidirectional OBC also lacks effective communication interface to receive function configuration information of the power grid.

As shown in FIG. 1, it illustrates a structure of the existing V2G system, which mainly includes an EV and an EVSE, wherein the EV mainly includes a battery, an OBC and an EVCC, and the EVSE mainly includes a charge and discharge connection device and a SECC. The battery may be connected to the power grid through the OBC and the charge and discharge connection device to form an energy flow among the EV, the EVSE and the power grid for charging and discharging, and also form an information flow among the EV, the EVSE and a cloud service for delivering information. However, in the existing conventional design, only the supply equipment communication controller (SECC) in the EVSE has an external communication interface, and capable to receive function configuration information of the power grid. Moreover, the SECC directly communicates with the electric vehicle communication controller (EVCC) only in the EV, and communication timing and content are often strictly defined by the relevant charging standard (such as, ISO15118-20), and cannot be self-defined to add additional contents. Therefore, the SECC cannot directly send the function configuration information related to the power grid to the OBC, but can only realize portions about calculation of power and determination of protection conditions in these functions by itself, and then send instructions of power control and protection action to the OBC for execution. This causes that some functions having complex parameters or a high requirement for response time cannot be better realized.

SUMMARY OF THE APPLICATION

An object of the application is to provide an interaction system between an electric vehicle and a power grid, which can effectively solve one or more deficiencies in the prior art.

To achieve the object, the application provides an interaction system between an electric vehicle and a power grid, including the electric vehicle including: a battery; and an on board charger including a bidirectional power conversion circuit connected to the battery and an on board charger controller; an electric vehicle supply equipment including: a charge and discharge connection device including a first contactor connected between the power grid and the bidirectional power conversion circuit; and an interaction communication system including: an electric vehicle communication controller; a supply equipment communication controller; and the on board charger controller controlling the bidirectional power conversion circuit; wherein the supply equipment communication controller directly communicates with the electric vehicle communication controller, the supply equipment communication controller indirectly communicates with the on board charger controller via the electric vehicle communication controller through a first communication channel, and the supply equipment communication controller further directly communicates with the on board charger through a second communication channel.

The interaction system between the electric vehicle and the power grid according to the application sends the function configuration information related to the power grid by adding direct communication between the supply equipment communication controller (SECC) and the on board charger (OBC), and on such basis, the power grid functions having a high requirement for response time and in close relation with control of a switching converter of the OBC can be directly executed in the OBC, thereby making reasonable use of resources, and ensuring that the interaction system between the electric vehicle and the power grid according to the application conforms to the laws and regulations of the power grid.

BRIEF DESCRIPTION OF THE DRAWINGS

Exemplary embodiments are described in details with reference to the accompanying drawings, and the above and other features and advantages of the application become more apparent.

DETAILED EMBODIMENTS OF THE APPLICATION

Figure 1:
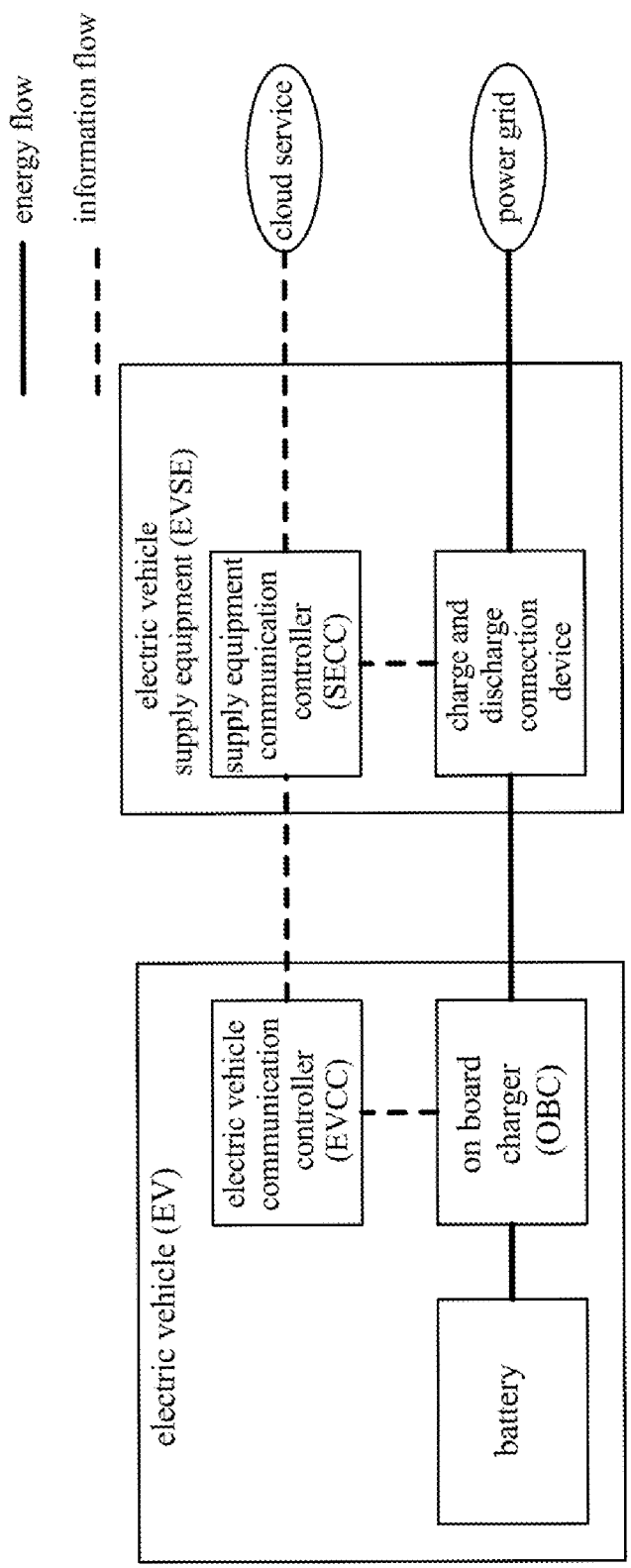
FIG. 1 is a block diagram of a structure of the existing V2G system.

Now the exemplary embodiments are comprehensively described with reference to the accompanying drawings. However, the exemplary embodiments can be implemented in various forms, and shall not be understood to be limited to the described embodiments. On the contrary, providing these embodiments makes the application comprehensive and complete, and concept of the exemplary embodiments are fully conveyed to those skilled in the art. The same reference signs in the drawings represent the same or similar structure, so detailed descriptions are omitted.

When introducing the described and/or illustrated factors or constituent portions or the like, the words "one", "first", "the" and "at least one" represent one or more factors or constituent portions, or the like. The terms "comprise", "include" and "have" represent an open and including meaning, and refer to other factors or constituent portions, or the like, except the listed factors or constituent portions, or the like. Moreover, when two components refer to "connect" or "couple", both may be directly connected or coupled, and may also have an intervention component. The embodiments may use relative words, such as, "upper" or "lower" to describe a relative relation of one component over another component. It can be understood that if the signed device is inverted up side down, the "upper" component becomes a "lower" component. Moreover, the terms "first", "second" and the like in the claims are only used as signs, instead of limiting to the numbers of the object.

In order to allow operation of the feedback network, the interaction system between an electric vehicle and a power grid must conform to laws and regulations of the local power grid, and have a series of power grid functions as specified in the laws and regulations of the power grid. Generally, the interaction system may include but not limited to the following power grid functions:

(1) power regulation function, for example, including a fixed active power (fix P), a fixed power factor control (fix PF), a fixed reactive power control (fix Q), a voltage-reactive power control (Volt-Var), an active power-power factor control (Watt-PF), an active power-reactive power control (Watt-Var), a voltage-active power control (Volt-Watt), a frequency-active power control (Freq-Watt), an export power limiting function, and the like.

(2) fault ride through function, for example, including low voltage ride through (LVRT), high voltage ride through (HVRT), low frequency ride through (LFRT), high frequency ride through (HFRT), and the like.

(3) fault protection function, for example, including over voltage protection (OVP), under voltage protection (UVP), over frequency protection (OFP), under frequency protection (UFP), and export over power protection, and the like.

(4) enter service function, for example, including reconnection voltage and frequency detection, reconnection countdown delay, and the like.

(5) island detection function.

Figure 2:
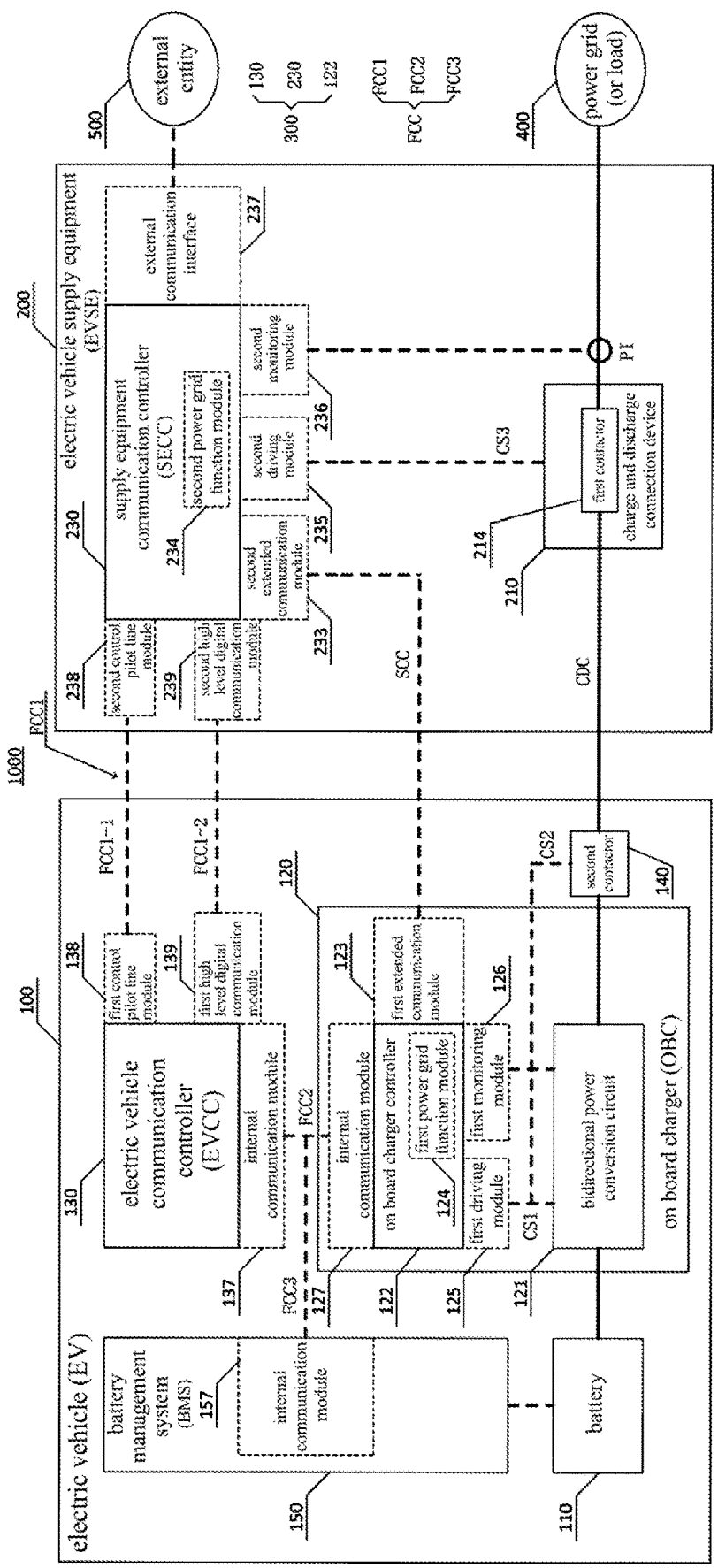
FIG. 2 is a block diagram of a structure of an interaction system between an electric vehicle and a power grid in one embodiment of the application.

As shown in FIG. 2, it illustrates a structure of an interaction system between an electric vehicle and a power grid in one embodiment of the application, wherein main power lines of the system are shown by solid lines, and communication and control lines of the system are shown by dotted lines. In the application, an interaction system 1000 between an electric vehicle and a power grid may include the electric vehicle (EV) 100, an electric vehicle supply equipment (EVSE) 200 and an interaction communication system 300. The EV 100 includes a battery 110, an on board charger (OBC) 120 and an electric vehicle communication controller (EVCC) 130. The OBC 120 may include a bidirectional power conversion circuit 121 and an on board charger controller 122, and the bidirectional power conversion circuit 121 is connected to the battery 110 for converting an AC electric energy at a power grid side into a DC electric energy to charge the battery 110, or converting the DC electric energy stored in the battery 110 into the AC electric energy to be discharged to a power grid (or a load) 400, thereby realizing bidirectional transmission of energy. The EVSE 200 may include a charge and discharge connection device 210 and a supply equipment communication controller (SECC) 230. The charge and discharge connection device 210 may include a first contactor 214 connected between the power grid 400 and the bidirectional power conversion circuit 121, and for controlling the on/off state there between, and the first contactor 214 may be but not limited to a circuit breaker. The interaction communication system 300 includes the EVCC 130, the SECC 230 and the on board charger controller 122. The on board charger controller 122 controls the bidirectional power conversion circuit 121. In the application, the SECC 230 directly communicates with the EVCC 130. The SECC 230 indirectly communicates with the on board charger controller 122 via the EVCC 130 through a first communication channel FCC, wherein the first communication channel FCC comprises a channel FCC1 and a channel FCC2, the SECC 230 communicates with the EVCC 130 via the FCC1, the EVCC 130 communicates with the on board charger controller 122 via a FCC2. The SECC 230 further directly communicates with the OBC 120 through a second communication channel SCC.

In some embodiments of the application, the on board charger controller 122 may have a first extended communication module 123, the SECC 230 may have a second extended communication module 233, and the second communication channel SCC is connected between the first extended communication module 123 and the second extended communication module 233.

In some embodiments of the application, power line communication (PLC) may be adopted between the SECC 230 and the OBC 120, thus the second communication channel SCC may be coupled to a power line between the bidirectional power conversion circuit 121 and the charge and discharge connection device 210. Those skilled in the art may adjust communication carrier mode and its coupling line according to actual application, and the communication carrier mode and the coupling line of the second communication channel SCC are not limited thereto.

In some embodiments of the application, the SECC 230 may be provided with function configuration information of the power grid 400 in advance, and may also communicate with an external entity 500 to acquire initial function configuration information of the power grid 400, or communicate with the external entity 500 to acquire the function configuration information of the power grid 400 and update function configuration information within the SECC 230, but the application is not limited thereto. The function configuration information may include at least one or more of power grid function enable signals, execution manners and execution parameters. The power grid function enable signals may include signals corresponding to at least one or more power grid functions of power regulation function, fault ride through function, fault protection function, enter service function and island detection function, but the application is not limited thereto. The execution manners may include at least one or more information of different types of power regulation curve and detection method, but the application is not limited thereto. The execution parameters may include at least one or more information of parameters of the power regulation curve, action threshold and action time, but the application is not limited thereto. Preferably, the SECC 230 communicates with the external entity 500 through an external communication interface 237, the external communication interface 237, for example, may be a gateway module, and the external entity 500, for example, may include charging pile operators, grid corporations, energy management systems, and/or cloud services, but the application is not limited thereto.

In some embodiments of the application, preferably, the on board charger controller 122 may acquire the function configuration information of the power grid 400 through the second communication channel SCC.

In some embodiments of the application, the on board charger controller 122 may include a first power grid function module 124, a first monitoring module 126 and a first driving module 125. The first monitoring module 126 may monitor a circuit operating state of the bidirectional power conversion circuit 121, and the circuit operating state may include at least one or more of an operating current, an operating voltage and an operating power. In other embodiments, it may further include temperature, and the like, but the application is not limited thereto. The first power grid function module 124 may generate at least a first control signal CS1 according to the function configuration information and the circuit operating state of the bidirectional power conversion circuit 121, and the first control signal CS1 may control the bidirectional power conversion circuit 121 through the first driving module 125 to regulate an output power or stop power conversion, but the application is not limited thereto.

In some embodiments of the application, the EV 100 may further include a second contactor 140 connected between the bidirectional power conversion circuit 121 and the first contactor 214, and the second contactor 140 may be but not limited to a relay. The first power grid function module 124 may further generate a second control signal CS2 according to the function configuration information and the circuit operating states of the bidirectional power conversion circuit 121, and the second control signal CS2 may control the second contactor 140 to break or close the connection between the bidirectional power conversion circuit 121 and the first contactor 214 through the first driving module 125.

In some embodiments of the application, the SECC 230 may include a second power grid function module 234, a second monitoring module 236 and a second driving module 235. The second monitoring module 236 may monitor an operating state of a grid-connection point PI between the EV 100 and the power grid 400, and the operating state of the grid-connection point may include at least one or more of a grid current, a grid voltage and a grid power. The second power grid function module 234 may generate at least a third control signal CS3 according to the function configuration information and the operating state of the grid-connection point, and the third control signal CS3 may control the first contactor 214 to break or close the connection between the power grid 400 and the bidirectional power conversion circuit 121 through the second driving module 235.

In some embodiments of the application, the SECC 230 may have a first communication module (such as, a second control pilot line module 238 and/or a second high level digital communication module 239, but the application is not limited thereto). The EVCC 130 may have a second communication module (such as, a first control pilot line module 138 and/or a first high level digital communication module 139, but the application is not limited thereto) and a third communication module (such as, an internal communication module 137, but the application is not limited thereto). The on board charger controller 122 may have a fourth communication module (such as, an internal communication module 127, but the application is not limited thereto). The first communication channel FCC may include a first sub-communication channel FCC1 and a second sub-communication channel FCC2. The first sub-communication channel FCC1 is connected between the first communication module and the second communication module, and for example, includes a sub-communication channel FCC1-1 connected between the first control pilot line module 138 and the second control pilot line module 238, and/or a sub-communication channel FCC1-2 connected between the first high level digital communication module 139 and the second high level digital communication module 239. The second sub-communication channel FCC2 is connected between the third communication module (such as, the internal communication module 137) and the fourth communication module (such as, the internal communication module 127).

The first sub-communication channel FCC1 may be coupled to a control pilot line or a private line between the SECC 230 and the EVCC 130, but the application is not limited thereto. Signals transmitted through the first sub-communication channel FCC1 may include a first information and a second information. The first information may be transmitted by using basic analog communication, for example, to communicate through the sub-communication channel FCC1-1, and the first information may include one or more of the following information for indicating: whether a charging gun is inserted, whether the electric vehicle communication controller and the electric vehicle are prepared for charging, what is the maximum charging current, and whether fault shutdown occurs, but the application is not limited thereto. The second information may be transmitted by using high level digital communication, for example, to communicate through the sub-communication channel FCC1-2, and the second information may include one or more of verification, authentication, an estimated departure time, and charge and discharge power instruction, but the application is not limited thereto.

In some embodiments of the application, the EV 100 may further include a battery management system (BMS) 150. The interaction communication system 300 may further include the battery management system 150. The battery management system 150 may monitor a battery state of the battery 110. The battery management system 150 may have a fifth communication module (such as, an internal communication module 157, but the application is not limited thereto), and the first communication channel FCC may further include a third sub-communication channel FCC3 connected between the fifth communication module (such as, the internal communication module 157) and the third communication module (such as, the internal communication module 137).

In some embodiments of the application, the second power grid function module 234 may also generate the at least one first control signal CS1 according to the function configuration information and the circuit operating states of the bidirectional power conversion circuit 121, the first control signal CS1 may be sent to the EVCC 130 via the first sub-communication channel FCC1, and the first control signal CS1 may control the bidirectional power conversion circuit 121 to regulate the operating power or stop power conversion through the first driving module 125.

In the embodiment shown in FIG. 2, the charge and discharge connection device 210 is connected to the bidirectional power conversion circuit 121 through a single channel, such as, a charge and discharge channel CDC.

Figure 3:
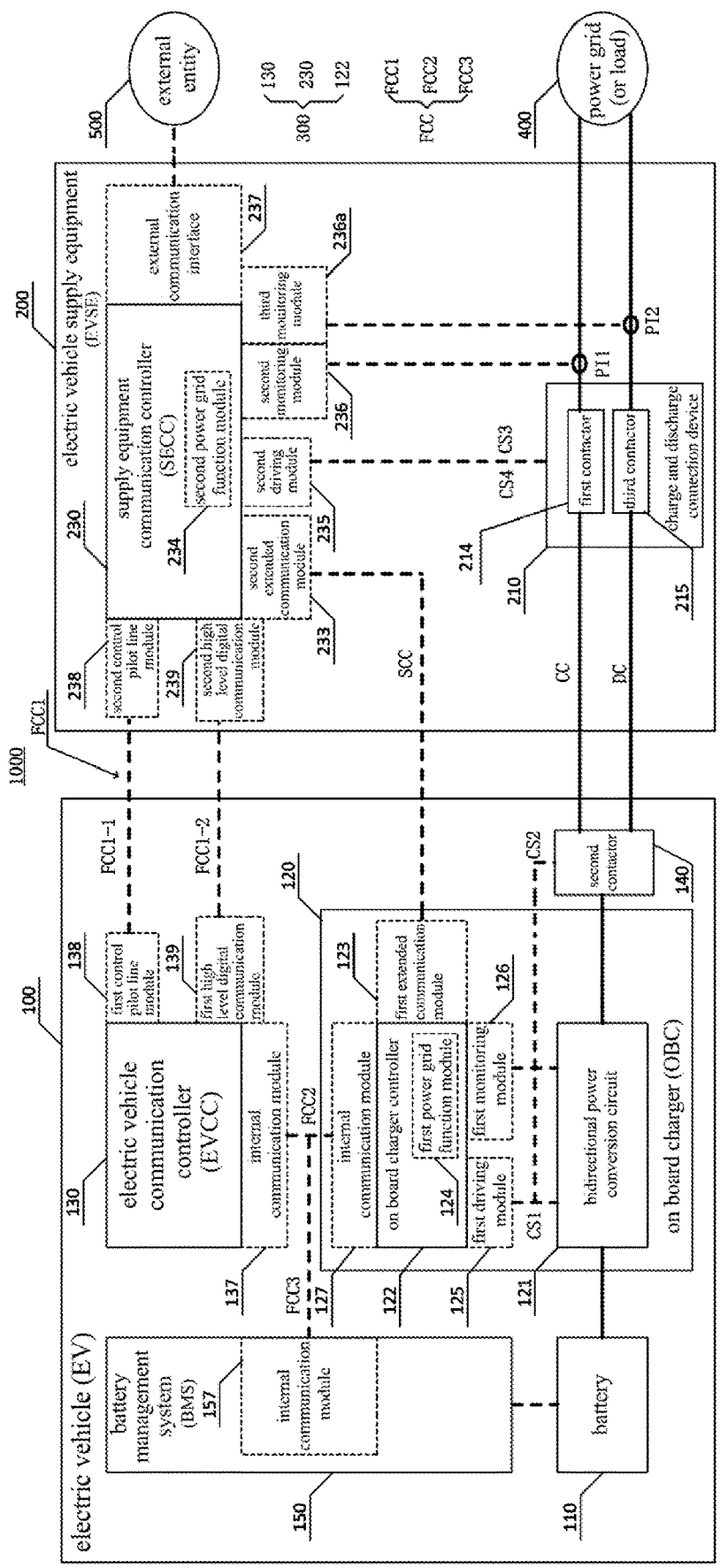
FIG. 3 is a block diagram of a structure of an interaction system between an electric vehicle and a power grid in another embodiment of the application.

As shown in FIG. 3, it illustrates a structure of an interaction system between an electric vehicle and a power grid in another embodiment of the application. What is different from the embodiment of FIG. 2 is that in the embodiment of FIG. 3, the charge and discharge connection device 210 is connected to the bidirectional power conversion circuit 121 through a dual channel, which includes a charge channel CC and a discharge channel DC. Moreover, the charge and discharge connection device 210 may further include a third contactor 215. In the embodiment shown in FIG. 3, the first contactor 214 is used to control the on/off state of the charge channel CC, and the third contactor 215 is used to control the on/off state of the discharge channel DC. The SECC 230 further includes a third monitoring module 236a, the second monitoring module 236 may monitor the operating state of a grid-connection point PI1 of the charge channel CC, and the third monitoring module may monitor the operating state of a grid-connection point PI2 of the discharge channel DC.

In the embodiment shown in FIG. 3, the second power grid function module 234 may further generate a fourth control signal CS4 according to the function configuration information and operating state of the grid-connection point PI2, and the fourth control signal CS4 may control the third contactor 215 to break or close the connection between the power grid 400 and the bidirectional power conversion circuit 121 through the second driving module 235. Moreover, the second power grid function module 234 may generate the third control signal CS3 according to the function configuration information and an operating state of the grid-connection point PI1, and the third control signal CS3 may control the first contactor 214 to break or close the connection between the power grid 400 and the bidirectional power conversion circuit 121 through the second driving module 235.

In the application, the interaction system between an electric vehicle and a power according to the application can use a single channel architecture (as shown in FIG. 2) or a dual channel architecture (as shown in FIG. 3). When using the single channel architecture, charge and discharge power flows on the same line (such as, the charge and discharge channel CDC in FIG. 2), the charge and discharge connection device 210 may break or close the connection of the channel using the same switch (such as, the first contactor 214 in FIG. 2), and the second monitoring module 236 may monitor using the same instrument. When using the dual channel architecture, charging and discharging may use two discrete lines (such as, the charge channel CC and the discharge channel DC in FIG. 3), the charge and discharge connection device 210 may break or close the connection of the two channels respectively using two switches (such as, the first contactor 214 and the third contactor 215 in FIG. 3), and the second monitoring module 236 and the third monitoring module 236a may monitor states of the two lines using two different instruments, thereby separately controlling the charge channel and the discharge channel, and further improving flexibility and accuracy of operation of the system.

Hereinafter the procedure of delivery of information flow (including various information and signals) involved in the interaction system between an electric vehicle and a power grid of the application is further explained in details.

In some embodiments of the application, the SECC 230 and the EVCC 130 may have at least two different communication modes:

the first communication mode: basic analog communication, which is implemented by the first control pilot line module 138 at an EVCC side and the second control pilot line module 238 at a SECC side via a control pilot (CP) line of the charging gun. Generally, the SECC 230 may generate PWM signals (i.e., CP signals) with a fixed frequency and a variable duty ratio, and deliver information to the EVCC 130 through an amplitude and a duty ratio of the PWM signals, and the EVCC 130 may also regulate the amplitude of the PWM signals through the way such as resistance dividing voltage to return information to the SECC 230. Specific technical details may be executed following relevant standard, such as, IEC61851-1. The basic analog communication can only deliver very simple information for indicating, for example, whether a charging gun is inserted, whether the EVSE and the EV are prepared for charging, what is the maximum charging current, whether fault shutdown occurs, and the like.

a second communication mode: high level communication (HLC), which is implemented by the first high level digital communication module 139 at the EVCC side and the second high level digital communication module 239 at the SECC side via the CP line of the charging gun or another private line. According to difference of reference standards, the HLC can have multiple implementations, but the application is not limited thereto. A few typical implementations are listed as follows:

implementation 1: referring to ISO15118-3 or DIN70121, it may be implemented by coupling PLC signals on the CP line using the power line communication (PLC) mode, and the basic CP signals and the PLC signals can be transmitted simultaneously without influence on each other by adding a filter network.

implementation 2: referring to IEC61851, it may be implemented by using local interconnect network (LIN) communication mode via the CP line, and when using the LIN communication mode, the original PWM CP signals will be replaced.

implementation 3: referring to CHAdeMO, it may be implemented by using controller area network (CAN) communication mode via an additional CAN communication line.

The HLC can deliver information richer than the basic analog communication, such as, verification, authentication, an estimated departure time, and charge and discharge power instruction. However, specific timing and content of the HLC communication protocol shall be defined following the standard, and cannot be self-defined to add additional contents according to actual needs.

In some embodiments of the application, the EVCC 130, the on board charger controller 122, and the BMS 150 may communicate through the internal communication modules 127, 137 and 157, and specific communication mode is not limited, for example, using CAN communication. The EVCC 130 may acquire charge and discharge plan or charge and discharge power instruction from the SECC 230, acquire the current battery state (such as, SOC, etc.) from the BMS 150 for calculating the desired charge and discharge power, and then the desired charge and discharge power may be sent to the on board charger controller 122, so as to control the bidirectional power conversion circuit 121 to complete charge and discharge actions. Meanwhile, the EVCC 130 may also acquire information such as voltage, current, power and temperature of the bidirectional power conversion circuit 121 from the on board charger controller 122, and feed these information back to the SECC 230 in real time. Through the way, indirect communication between the SECC 230 and the on board charger controller 122 via the EVCC 130 are realized (i.e., indirect communication through "the first communication channel FCC").

In some embodiments of the application, the SECC 230 further directly communicates with the on board charger controller 122 through a communication channel between the second extended communication module 233 and the first extended communication module 123 (i.e., direct communication through "the second communication channel SCC"), and specific communication mode is not limited. For example, it may be implemented by coupling the PLC signals on an AC main power line using the PLC communication mode. Since the communication timing and content between the SECC 230 and the on board charger controller 122 can be voluntarily designed according to actual needs, there is high flexibility in terms of interaction of the communication content and implementation of the power grid functions.

In some embodiments of the application, the SECC 230 may communicate with the external entity 500 through the external communication interface 237, the external communication interface 237, for example, may be a gateway module, and the external entity 500 may include charging pile operators, grid corporations, energy management systems (EMS), cloud services, and the like according to actual situations.

In some embodiments of the application, the function configuration information of the power grid may be saved and managed by the SECC 230, or may be preset in the SECC 230 by installers when installing, or may also be sent by the grid corporations to the SECC 230 through the external communication interface 237 when updating.

In some embodiments of the application, the power grid functions may have at least the following three implementations:

implementation 1: directly processing the power grid functions in the second power grid function module 234 of the SECC 230 for controlling the charge and discharge connection device 210 to perform protection action of disconnection via the second driving module 235.

implementation 2: directly processing the power grid functions in the second power grid function module 234 of the SECC 230, then sending the processing results to the on board charger controller 122 via the first communication channel FCC for controlling the bidirectional power conversion circuit 121 to perform power regulation action or stop charge and discharge protection action.

implementation 3: sending the function configuration information and other essential information of the power grid from the SECC 230 to the on board charger controller 122 via the second communication channel SCC, processing the function configuration information and other essential information of the power grid in the first power grid function module 124 of the on board charger controller 122 for directly controlling the bidirectional power conversion circuit 121 to perform power regulation action or stop charge and discharge protection action.

In the application, according to specific laws and regulations and actual situations, the respective power grid functions can be implemented using one or a combination of several modes.

Generally, the functions relating to the control of the OBC operation and having a requirement for short response time may be implemented by the implementation 3, and the functions relating to operation of the charge and discharge connection device 210 or the functions without a requirement for short response time may be implemented by the implementation 1 or 2. Table 1 gives an implementation example:

TABLE 1

| | Power Grid Functions | Implementation 1 | Implementation 2 | Implementation 3 |
|---|---|---|---|---|
| 1 | power regulation function (fix P, fix PF, fix Q, Volt-Var, Watt-PF, Watt-Var, Volt-Watt, Freq-Watt, export power limiting function) | NA | calculating the desired active power and reactive power in the second power grid function module 234 in real time, then sending the desired active power and reactive power to the on board charger controller 122 via the first communication channel FCC for controlling an output power of the bidirectional power conversion circuit 121 | sending the configuration information to the on board charger controller 122 via the second communication channel SCC in advance, calculating the desired active power and reactive power in the first power grid function module 124 in real time for controlling the output power of the bidirectional power conversion circuit 121 |

TABLE 1-continued

| Power Grid Functions | Implementation 1 | Implementation 2 | Implementation 3 |
|---|---|---|---|
| 2 fault ride through function (LVRT, HVRT, LFRT, HFRT) | NA | NA | sending the configuration information to the on board charger controller 122 via the second communication channel SCC, determining fault ride through in the first power grid function module 124, and then controlling the bidirectional power conversion circuit 121 to momentary stop or recover the charge and discharge actions |
| 3 fault protection function (OVP, UVP, OFP, UFP, export over power protection) | detecting the fault in the second power grid function module 234, and after the fault is detected, and then controlling the charge and discharge connection device 210 to perform the protection action of disconnection via the second driving module 235 | NA | sending the configuration information to the on board charger controller 122 via the second communication channel SCC, detecting faults in the first power grid function module 124, and controlling the bidirectional power conversion circuit 121 to perform the protection action of stop charging or discharging. |
| 4 enter service function | perform reconnection voltage and frequency detection and reconnection countdown delay in the second power grid function module 234, and only if the reconnection voltage and frequency conditions are satisfied and after countdown ends, the SECC 230 allows the charge and discharge connection device 210 to close, and continue the timing flow of charging and discharging | NA | NA |
| 5 island detection function | NA | NA | sending the configuration information to the on board charger controller 122 via the second communication channel SCC, performing the island detection function in the first power grid function module 124, and controlling the bidirectional power conversion circuit 121 to perform reactive injection |

TABLE 1-continued

| Power Grid Functions | Implementation 1 | Implementation 2 | Implementation 3 |
|---|---|---|---|
| | | | action for active islanding detection, and stop charging or discharging when islanding is detected |

In table 1, NA represents that the function can be implemented by other implementations. For example, as for power regulation function, in the American standard IEEE 1547-2018, the shortest response time of Freq-Watt is 0.2 s. However delay of the first communication channel FCC and delay of the OBC control cannot satisfy such requirement. In the implementation 3, the configuration information may be sent to the on board charger controller 122 via the second communication channel SCC in advance, and the desired active power and reactive power are in real time calculated without additional communication delay in the first power grid function module 124 of the on board charger controller 122, thus the requirement for fast response can be satisfied. Meanwhile, in some embodiments, the power regulation function further includes, but not limited to at least a part of the configuration information of power regulation enable bit, power regulation curve, and the like, and when the first communication channel FCC is a standard data transmission channel, as for the lacked definition of relevant data transmission, the transmission data may be self-defined through the second communication channel SCC, and then the relevant configuration information is transmitted in order to realize more power grid functions. As for the fault ride through function in the American standard IEEE 1547-2018, LVRT requires that when a power grid voltage drops less than 50%, the OBC momentary stops outputting within 83 ms, and recovers outputting after the power grid voltage is recovered. During information interaction, communication delay on the first communication channel FCC and delay of the OBC control will cause a long time response, thus it is difficult to satisfy such requirement. Through the implementation 3, the fault ride through function enables ride through detection and action to be implemented by the OBC without additional communication delay, thereby satisfying the requirement of fast response. Meanwhile, the configuration information includes, but not limited to non-standard communication information such as fault ride through threshold, and fault ride through response time. For another example, when the power grid has fault, the implementation 3 allows the fault protection action to be directly performed by the OBC by disconnecting connection between the power grid and the vehicle, and can avoid generating a high surge voltage or surge current in the power circuit in the case that the fault protection function cuts off the power grid without informing the operating OBC, thereby avoiding device damage in the OBC. The configuration information of the fault protection function includes, but not limited to fault protection threshold and fault protection time. In active island detection, a common disturbance method is to inject the reactive power to the power grid according to a real-time-frequency of the power grid, and communication delay on the first communication channel FCC cannot satisfy the real-time requirement. The implementation 3 enables relevant control, detection and protection actions to be implemented by the OBC without additional delay, thereby satisfying the real-time requirement, and configuration information of the island detection function includes, but not limited to island function enable bit, island detection method selection, reactive injection value setting and island detection threshold. Since there is no definition in HLC communication protocol, the configuration information of the power grid functions often cannot be sent through the first communication channel FCC, and only can be sent through the second communication channel SCC, so when lacking definition in the first communication channel FCC, such configuration information may be sent through the second communication channel SCC, and various power grid functions and configuration information are not limited thereto.

To sum up, in the interaction system between the electric vehicle and the power grid, since a part of power grid functions has the requirement of accuracy, rapidity and reliability, the implementation 1 or 2 cannot satisfy a part of characteristics. The application acquires direct communication between the electric vehicle and the power grid by adding the second communication channel SCC, and direct communication can save communication time during the interaction between the power grid and the electric vehicle, and then satisfy the rapidly requirement of the power grid functions. Due to the need of accuracy realization of the power grid functions, electric vehicle needs various configuration information for power grid function implementation. The second communication channel SCC can self-define the transmission way and content of relevant configuration information, thereby satisfying the requirement of accuracy of the electric vehicle for implementation of the power grid functions, also improving flexibility of configuration of the power grid functions, and ensuring that the interaction system between the electric vehicle and the power grid of the application can conform to the laws and regulations of various power grids. Since the electric vehicle acquires relevant configuration information through the second communication channel SCC, and completes relevant actions of calculation, detection and control inside, a calculating pressure of the supply communication equipment can be reduced, thereby improving operation performance of the interaction system between the power grid and the electric vehicle.

The exemplary embodiments of the application are illustrated and described in details. It shall be understood that the application is not limited to the disclosed embodiments, and on the contrary, the application intends to cover various modifications and equivalent arrangements included in spirit and scope of the appended claims.

What is claimed is:

1. An interaction system between an electric vehicle and a power grid, comprising:
   the electric vehicle comprising:
   a battery;
   an on board charger comprising a bidirectional power conversion circuit connected to the battery and an on board charger controller;
   an electric vehicle supply equipment comprising:
   a charge and discharge connection device comprising a first contactor connected between the power grid and the bidirectional power conversion circuit;
   an interaction communication system comprising:
   an electric vehicle communication controller;
   a supply equipment communication controller;
   the on board charger controller controlling the bidirectional power conversion circuit;
   wherein the supply equipment communication controller directly communicates with the electric vehicle communication controller;
   the supply equipment communication controller indirectly communicates with the on board charger controller via the electric vehicle communication controller through a first communication channel; and
   the supply equipment communication controller further directly communicates with the on board charger through a second communication channel.

2. The interaction system between an electric vehicle and a power grid according to claim 1, wherein the on board charger controller comprises a first extended communication module, and the supply equipment communication controller comprises a second extended communication module, wherein the second communication channel is connected between the first extended communication module and the second extended communication module.

3. The interaction system between an electric vehicle and a power grid according to claim 1, wherein power line communication is adopted between the supply equipment communication controller and the on board charger, and the second communication channel is coupled to a power line between the bidirectional power conversion circuit and the charge and discharge connection device.

4. The interaction system between an electric vehicle and a power grid according to claim 1, wherein the supply equipment communication controller is provided with function configuration information of the power grid, and/or communicates with an external entity to acquire the function configuration information of the power grid, and the function configuration information comprises at least one or more of power grid function enable signals, execution manners and execution parameters.

5. The interaction system between an electric vehicle and a power grid according to claim 4, wherein the on board charger controller acquires the function configuration information of the power grid through the second communication channel.

6. The interaction system between an electric vehicle and a power grid according to claim 5, wherein the on board charger controller comprises a first power grid function module, a first monitoring module, and a first driving module; wherein,
   the first monitoring module monitors an operating state of the bidirectional power conversion circuit, and the operating state comprises at least one or more of an operating current, an operating voltage and an operating power;
   the first power grid function module generates at least one first control signal according to the function configuration information and the operating state of the bidirectional power conversion circuit, and the first control signal controls the bidirectional power conversion circuit to regulate the operating power or stop power conversion through the first driving module.

7. The interaction system between an electric vehicle and a power grid according to claim 6, wherein the electric vehicle further comprises a second contactor connected between the bidirectional power conversion circuit and the first contactor; wherein,
   the first power grid function module further generates a second control signal according to the function configuration information and the operating state of the bidirectional power conversion circuit, and the second control signal controls the second contactor to break or close the connection between the bidirectional power conversion circuit and the first contactor through the first driving module.

8. The interaction system between an electric vehicle and a power grid according to claim 6, wherein the supply equipment communication controller comprises a first communication module, the electric vehicle communication controller comprises a second communication module and a third communication module, and the on board charger controller has a fourth communication module; wherein the first communication channel comprises a first sub-communication channel connected between the first communication module and the second communication module, and a second sub-communication channel connected between the third communication module and the fourth communication module.

9. The interaction system between an electric vehicle and a power grid according to claim 8, wherein the supply equipment communication controller comprises a second power grid function module, a second monitoring module, and a second driving module; wherein,
   the second monitoring module monitors an operating state of a grid-connection point between the electric vehicle and the power grid, and the operating state of the grid-connection point comprises at least one or more of a grid current, a grid voltage and a grid power;
   the second power grid function module generates at least one third control signal according to the function configuration information and the operating state of the grid-connection point, and the third control signal controls the first contactor to break or close the connection between the power grid and the bidirectional power conversion circuit through the second driving module.

10. The interaction system between an electric vehicle and a power grid according to claim 9, wherein the interaction communication system further comprises a battery management system for monitoring a battery state of the battery; the battery management system comprises a fifth communication module, and the first communication channel further comprises a third sub-communication channel connected between the fifth communication module and the third communication module.

11. The interaction system between an electric vehicle and a power grid according to claim 9, wherein the second power grid function module at least generates a first control signal according to the function configuration information and the operating state of the bidirectional power conversion circuit, the first control signal is sent to the electric vehicle communication controller via the first sub-communication channel, and the first control signal controls the bidirectional power conversion circuit to regulate the operating power or stop power conversion through the first driving module.

12. The interaction system between an electric vehicle and a power grid according to claim 4, wherein the power grid function enable signals comprise at least one or more signals corresponding to power grid functions of power regulation function, fault ride through function, fault protection function, enter service function and island detection function.

13. The interaction system between an electric vehicle and a power grid according to claim 4, wherein,
the execution manners at least comprise one or more of regulation curve types and detection method;
the execution parameters at least comprise one or more of regulation curve parameters, action threshold and action time.

14. The interaction system between an electric vehicle and a power grid according to claim 8, wherein signals on the first sub-communication channel comprise a first information using basic analog communication, and a second information using high level digital communication; the first sub-communication channel is coupled to a control pilot line or a private line between the supply equipment communication controller and the electric vehicle communication controller.

15. The interaction system between an electric vehicle and a power grid according to claim 14, wherein,
the first information comprises one or more of the following information for indicating: whether a charging gun is inserted, whether the electric vehicle communication controller and the electric vehicle are prepared for charging, what is the maximum charging current, and whether fault shutdown occurs;
the second information comprises one or more of verification, authentication, an estimated departure time, and charge and discharge power instruction.

16. The interaction system between an electric vehicle and a power grid according to claim 9, wherein,
the charge and discharge connection device is connected to the bidirectional power conversion circuit through a single channel.

17. The interaction system between an electric vehicle and a power grid according to claim 9, wherein,
the charge and discharge connection device is connected to the bidirectional power conversion circuit through a dual channel, which comprises a charge channel and a discharge channel;
the charge and discharge connection device further comprises a third contactor, the first contactor is configured to break and to close the charge channel, and the third contactor is configured to break and to close the discharge channel;
the supply equipment communication controller further comprises a third monitoring module, the second monitoring module monitors the operating state of a grid-connection point on the charge channel, and the third monitoring module monitors operating state of a grid-connection point on the discharge channel.

18. The interaction system between an electric vehicle and a power grid according to claim 17, wherein,
the second power grid function module further generates a fourth control signal according to the function configuration information and the operating state of the grid-connection point on the discharge channel, and the fourth control signal controls the third contactor to break or to close the connection between the power grid and the bidirectional power conversion circuit through the second driving module.

19. The interaction system between an electric vehicle and a power grid according to claim 4, wherein,
the supply equipment communication controller further communicates with the external entity through an external communication interface.

20. The interaction system between an electric vehicle and a power grid according to claim 19, wherein,
the external communication interface is a gateway module; and/or
the external entity comprises at least one type of charging pile operators, grid corporations, energy management systems, and/or cloud services.

* * * * *